United States Patent
Zhang et al.

(10) Patent No.: US 8,225,309 B2
(45) Date of Patent: Jul. 17, 2012

(54) METHOD AND PROCESS FOR USING COMMON PREINSTALLATION ENVIRONMENT FOR HETEROGENEOUS OPERATING SYSTEMS

(75) Inventors: Weijia Zhang, Round Rock, TX (US); Kevin W. Deike, Round Rock, TX (US); Manoj Gujarathi, Round Rock, TX (US); Matthew Paul, Round Rock, TX (US); Charles T. Perusse, Jr., Plugerville, TX (US)

(73) Assignee: Dell Products L.P., Round Rock, TX (US)

( * ) Notice: Subject to any disclaimer, the term of this patent is extended or adjusted under 35 U.S.C. 154(b) by 1435 days.

(21) Appl. No.: 11/549,681

(22) Filed: Oct. 16, 2006

(65) Prior Publication Data

US 2008/0092134 A1    Apr. 17, 2008

(51) Int. Cl.
   *G06F 9/445* (2006.01)
(52) U.S. Cl. ......................................................... 717/175
(58) Field of Classification Search .......... 717/174–178, 717/170; 709/217, 223; 714/4, 36; 713/1, 713/2, 100; 711/154, 162; 725/58, 132; 703/13
   See application file for complete search history.

(56) References Cited

U.S. PATENT DOCUMENTS

| | | | |
|---|---|---|---|
| 5,899,987 A | 5/1999 | Yarom | |
| 6,549,912 B1 | 4/2003 | Chen | 707/104 |
| 6,591,418 B2 | 7/2003 | Bryan et al. | 717/177 |
| 6,598,223 B1 | 7/2003 | Vrhel, Jr. et al. | 717/174 |
| 6,671,749 B2 | 12/2003 | Williams et al. | 710/10 |
| 6,795,914 B2 | 9/2004 | Smith et al. | 713/2 |

(Continued)

FOREIGN PATENT DOCUMENTS

EP    0726518 A2    8/1996

(Continued)

OTHER PUBLICATIONS

"Remote Insight Lights-Out Edition, Virtual Floppy Drive, Product Description" Jan. 22, 2007, HP.Com <http://h18013.www1.hp.com/products/servers/management/remote-lightsout/newvirtdrive.html> (2 pages).

(Continued)

*Primary Examiner* — Tuan Anh Vu
(74) *Attorney, Agent, or Firm* — Hamilton & Terrile, LLP; Stephen A. Terrile

(57) ABSTRACT

A system and method is disclosed for the uniform installation of one or more of a plurality of heterogeneous operating systems (operating systems) on a predetermined information handling system. A common preinstallation environment (CPE) is implemented, comprising a host preinstallation environment (HPE) and one or more native preinstallation environments (NPEs). If an NPE is not required for installation, an HPE comprising a common, bootable kernel generates a bootable operating system image that is installed on the target system. Otherwise, the HPE creates a deployment partition, where it implements the NPE and generates a metafile describing the hardware drivers supported by the NPE. The HPE then inventories the hardware components comprising the target system and compares the results to the metafile. If all required drivers are accessible, the target system boots to the NPE, which begins native installation of the chosen operating system. Otherwise, the HPE injects the missing drivers into the operating system image generated by the NPE and the resulting operating system image is then installed on the target system. If the HPE cannot inject drivers into the NPE, then a stage handler is implemented to relinquish installation control to the NPE which completes a native installation.

12 Claims, 4 Drawing Sheets

U.S. PATENT DOCUMENTS

| | | | |
|---|---|---|---|
| 6,874,060 B2 | 3/2005 | Blood et al. | 711/111 |
| 7,024,493 B1 | 4/2006 | Tran | |
| 7,237,238 B2 * | 6/2007 | Peppers et al. | 717/170 |
| 7,565,517 B1 * | 7/2009 | Arbon | 713/1 |
| 2003/0028629 A1 | 2/2003 | Amro et al. | 709/222 |
| 2003/0191911 A1 * | 10/2003 | Kleinschnitz et al. | 711/154 |
| 2004/0025181 A1 * | 2/2004 | Addington et al. | 725/58 |
| 2004/0187104 A1 * | 9/2004 | Sardesai et al. | 717/174 |
| 2005/0204013 A1 * | 9/2005 | Raghunath et al. | 709/217 |
| 2007/0067679 A1 | 3/2007 | Deobald | |
| 2007/0101118 A1 * | 5/2007 | Raghunath et al. | 713/2 |

FOREIGN PATENT DOCUMENTS

| | | |
|---|---|---|
| EP | 1465064 A2 | 10/2004 |
| WO | WO 00/54149 | 9/2000 |

OTHER PUBLICATIONS

Search Report for application No. 200716867-7. Oct. 16, 2008 (pp. 1-9).

* cited by examiner

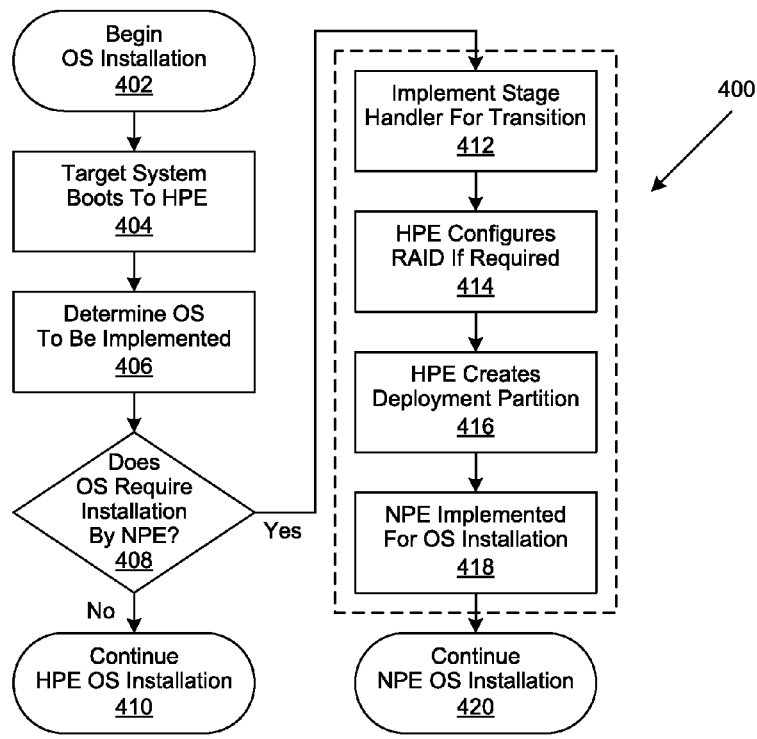

*Figure 4a*

| Transitional Stages 422 | Stage Descriptions 424 | Staging Options 426 ||
|---|---|---|---|
| | | Debug Build 428 | Release Build 430 |
| RAID Stage 432 | • Predetermined RAID Configuration Operations Performed | Yes | No |
| Driver Stage 434 | • Deployment Partitions Created<br>• Driver Files Copied<br>• Driver Media Can Be Removed | Yes | On Error: Yes<br>No Error: No |
| OS Stage 436 | • OS And Other Content Copied To Target System<br>• OS Media Can Be Removed | Yes | No |

*Figure 4b*

METHOD AND PROCESS FOR USING COMMON PREINSTALLATION ENVIRONMENT FOR HETEROGENEOUS OPERATING SYSTEMS

BACKGROUND OF THE INVENTION

1. Field of the Invention

The present invention relates in general to the field of information handling systems and more specifically, to the installation of heterogeneous operating systems.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The diversity and amount of data managed by information handling systems continues to grow, driving the need for cost effective, scalable systems that can be quickly and efficiently configured for a wide variety of uses and environments. This need has led to the adoption of build-to-order (BTO) computer systems that are custom-assembled to a customer's specifications from a variety of hardware components. The extended time typically required to configure and implement these systems consumes technical resources, has a negative impact on productivity, and contributes to the system's total cost of ownership (TCO). In particular, the initial loading of the system's operating system (OS) can be time consuming and tedious, especially when multiple operating systems are implemented in a heterogeneous operating environment. For example, new computer systems are generally first configured with their initial hardware components, an operating system is selected for installation, and the appropriate drivers for the hardware components comprising the system are located. In the past, the selected operating system and its related drivers were typically installed from locally-attached, physical media such as floppy disks, CDs, or hard disk drives. This approach required an operator to be physically present to not only load the chosen operating system and drivers, but also to make software configuration choices during the load procedure.

Current solutions to addressing this limitation include the implementation of a pre-execution environment, which allows a computer system to boot over a network connection and load a system image file of a predetermined operating system from a remote source. A pre-execution environment can provide other benefits as well. For example, the Dell Server Assistant (DSA), produced by Dell, Inc., provides the ability to configure redundant arrays of independent disks (RAID) and create a utility partition. DSA also has the ability to provide optimized OEM drivers that support installation of different operating systems from a single media image. As a result, time is saved since administrators do not need to be physically present at individual computers to monitor installation and boot from physical media.

However, currently emerging technologies are imposing new challenges to achieving a uniform, unattended process for installing heterogeneous operating systems such as Linux, Novell Netware, and Microsoft Windows. For example, the Windows Vista operating system uses a proprietary Boot Configuration Data (BCD) format, which provides data to the Windows boot manager to load the operating system. The Windows Vista operating system also uses Windows Imaging (WIM), a proprietary, file-based disk image format that stores the main components of the operating system in compressed form. During installation, the image file is decompressed and copied in-whole to the target system as opposed to prior versions of Windows, which were installed file by file in an iterative process. Even more challenging is when different installation procedures are required to load more than one operating system on a system, such as in a dual-boot configuration. These challenges are not limited to DSA. Other vendors face similar challenges in providing a uniform and common installation solution for heterogeneous operating systems.

SUMMARY OF THE INVENTION

In accordance with the present invention, a system and method is disclosed for the uniform installation of one or more of a plurality of heterogeneous operating systems on a predetermined information handling system. In selected embodiments of the invention, a common preinstallation environment (CPE) is implemented, comprising a host preinstallation environment (HPE) and one or more native preinstallation environments (NPEs). The HPE typically comprises a common bootable kernel, inventory modules for determining the hardware components comprising a target system, a redundant array of independent disks (RAID) configuration utility, disk format utilities, hardware drivers and patches, and operating system configuration utilities. The native preinstallation environment (NPE) comprises a predetermined operating system and other content. During the operating system installation process, both the HPE and NPE can be executed from physical media or through network delivery. As a result, the CPE can provide a uniform installation process for a plurality of heterogeneous operating systems such as, but not limited to, Netware, Windows, and Linux variants such as RedHat and Suse.

In an embodiment of the invention, an information handling system without an installed operating system boots to the CPE which determines whether installation of a predetermined operating system requires implementation of an NPE. If an NPE is not required for installation, an HPE comprising a common, bootable kernel generates a bootable operating system image that is installed on the target system. Otherwise, the HPE creates a deployment partition, where it implements the NPE and then generates a metafile describing the hardware drivers the NPE supports. The hardware components comprising the target system are then inventoried by the HPE the results are compared to the metafile. If the NPE has access to all drivers required to boot the target system then it boots to the NPE, which begins native installation of the chosen operating system. If the NPE does not have access to all required drivers, then the HPE injects the missing drivers into the operating system image generated by the NPE. In an embodiment of the invention, required drivers are dynamically injected by generating a driver data block for the NPE. The data block has a beginning and ending signature allowing the HPE to inject binary bits without requiring knowledge of the underlying file system. In another embodiment of the invention, if the HPE is unable to inject the required drivers, they are injected into the NPE operating system image off-line, using a native driver injection module provided by the NPE vendor. The resulting operating system image is then installed by the NPE on the target system.

In selected embodiments of the invention, a stage handler is implemented to transition control of the installation of a predetermined operating system from the HPE to a predetermined NPE. In these embodiments, an algorithm comprising the stage handler is implemented to determine at what stage control of the installation of a predetermined operating system should be transitioned from the HPE to a predetermined NPE. For example, if the algorithm determines that the HPE is unable to inject predetermined computer hardware drivers into the operating system image generated by the NPE, then control of the installation is relinquished to the NPE. In an embodiment of the invention, additional processes can be executed within each transitional phase, such as configuration compliance, replication and error recovery. Those of skill in the art will understand that many such embodiments and variations of the invention are possible, including but not limited to those described hereinabove, which are by no means all inclusive.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 4a-b show the transition from a host preinstallation environment (HPE) to a native preinstallation environment (NPE) within a CPE as implemented in accordance with an embodiment of the invention.

DETAILED DESCRIPTION

A system and method is disclosed for the uniform installation of one or more of a plurality of heterogeneous operating systems (operating systems) on a predetermined information handling system. In selected embodiments of the invention, a common preinstallation environment (CPE) is implemented, comprising a host preinstallation environment (HPE) and one or more native preinstallation environments (NPEs). If an NPE is not required for installation, an HPE comprising a common, bootable kernel generates a bootable operating system image that is installed on the target system. Otherwise, the HPE creates a deployment partition where it implements the NPE, and it then generates a metafile describing the hardware drivers the NPE supports. The hardware components comprising the target system are then inventoried by the HPE the results are compared to the metafile. If the NPE has access to all drivers required to boot the target system then it boots to the NPE, which begins native installation of the chosen operating system. Otherwise, the HPE injects the missing drivers into the operating system image generated by the NPE and the resulting operating system image is then installed on the target system. If the HPE cannot inject drivers into the NPE, then a stage handler is implemented to relinquish installation control to the NPE which completes a native installation. As a result, the CPE provides a uniform installation process for a plurality of heterogeneous operating systems such as, but not limited to, Netware, Windows, and Linux variants such as RedHat and Suse.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
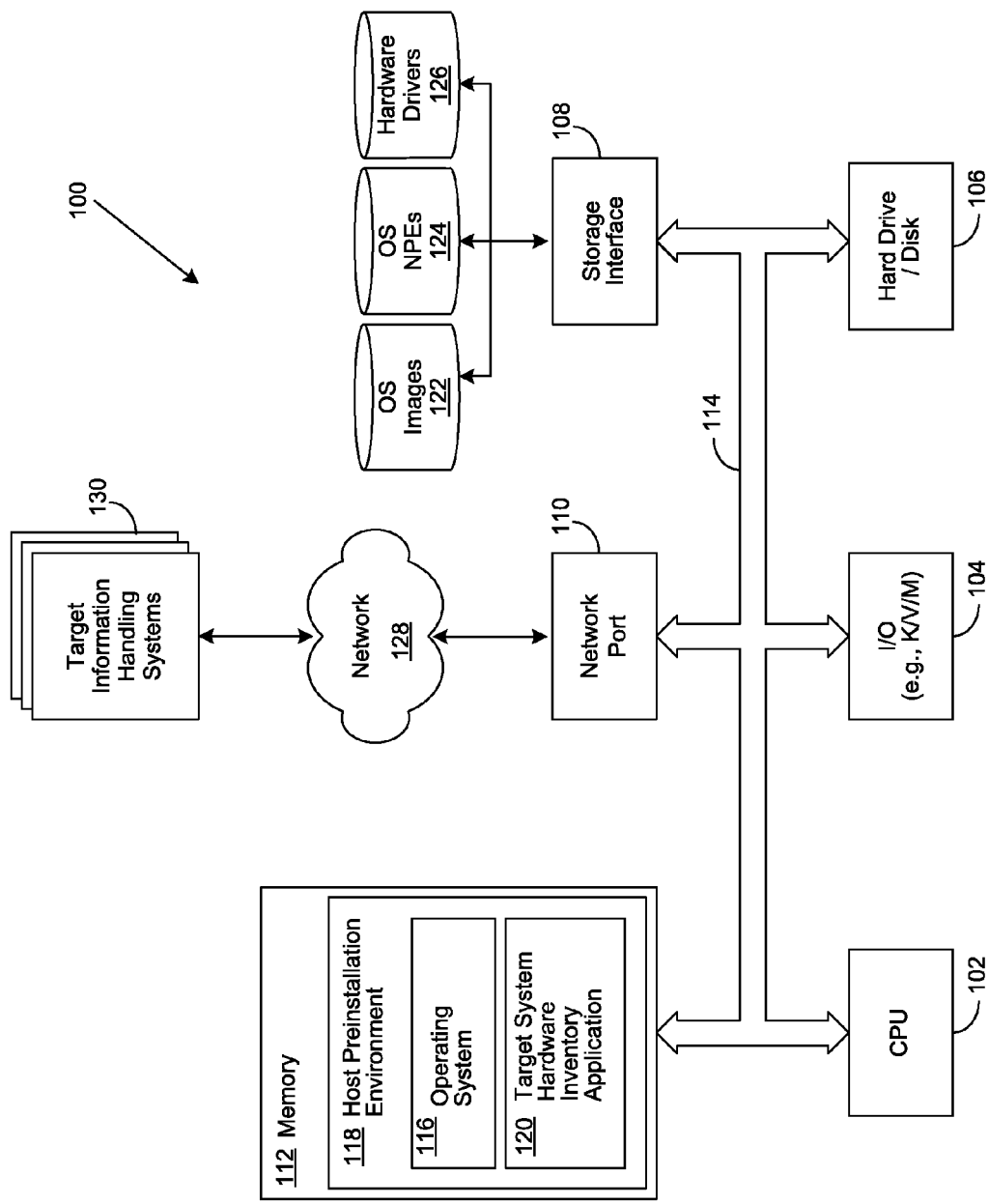
FIG. 1 is a generalized illustration of an information handling system that can be used to implement the present invention.

FIG. 1 is a generalized illustration of an information handling system 100 that can be used to implement the system and method of the present invention. The information handling system includes a processor (e.g., central processor unit or "CPU") 102, input/output (I/O) devices 104, such as a display, a keyboard, a mouse, and associated controllers, a hard drive or disk storage 106, storage interface 108, network port 110 operable to connect to a network 128, and system memory 112, all interconnected via one or more buses 114. System memory 112 comprises host preinstallation environment 118 which further comprises operating system 116 and target system hardware inventory application 120. Host preinstallation environment 118, in different embodiments of the invention, accesses operating system (OS) images 122, operating system native preinstallation environments (NPEs) 124, and hardware drivers 126 through storage interface 108 during installation of heterogeneous operating systems on the hard drive 106 of the information handling system 100. In selected embodiments of the invention, HPE 118 installs heterogeneous operating systems on target information handling systems 130 over network 128. In other embodiments of the invention, HPE 118 installs heterogeneous operating system images 122 on target information handling systems 130 over network 128 in conjunction with operating system NPEs 124.

Figure 2:
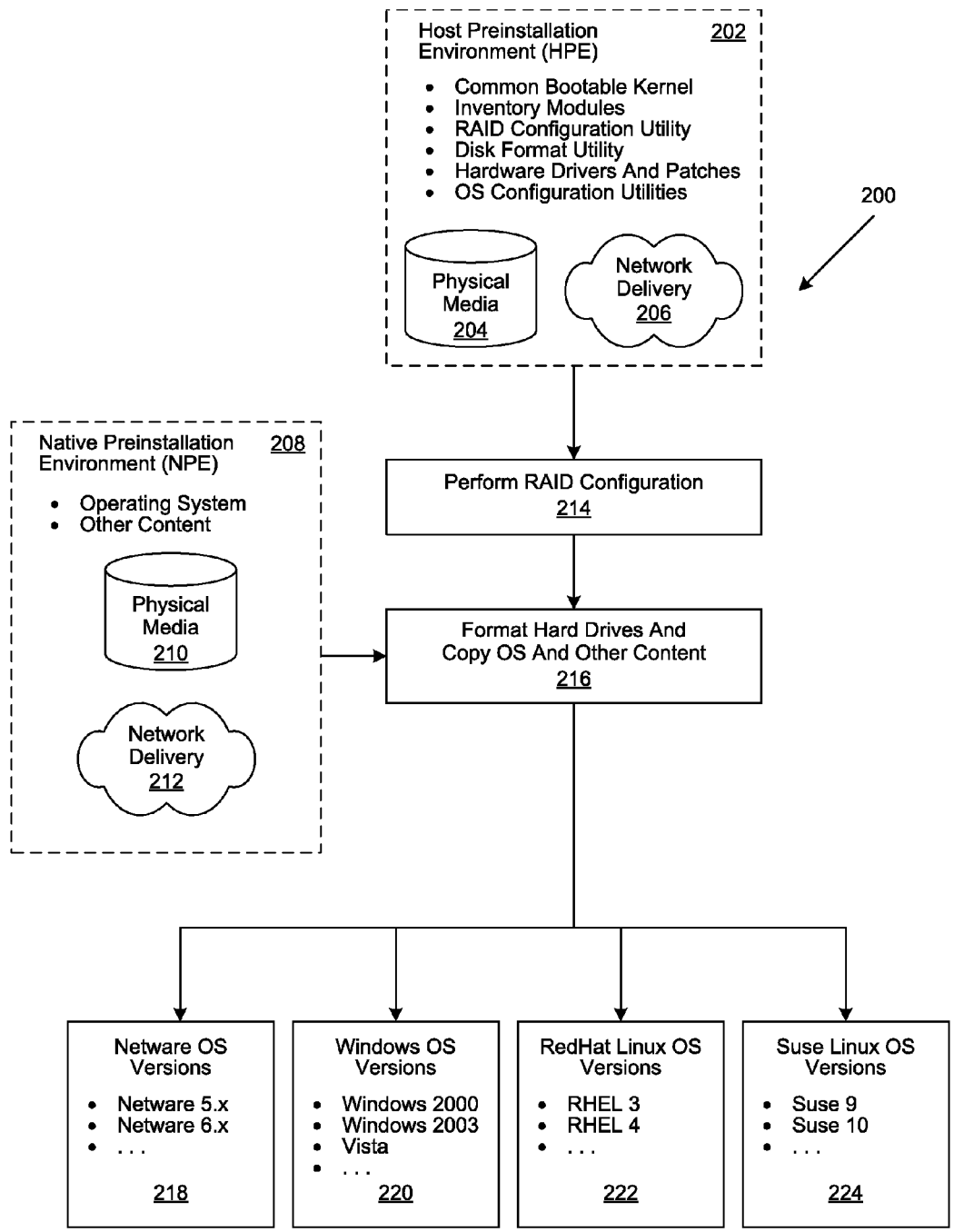
FIG. 2 shows a block diagram of common preinstallation environment (CPE) as implemented in accordance with an embodiment of the invention.

FIG. 2 shows a block diagram of common preinstallation environment (CPE) 200 as implemented in accordance with an embodiment of the invention. In this embodiment, host preinstallation environment (HPE) 202 comprises a plurality of components including a common bootable kernel and inventory modules for determining the hardware components comprising a target system. In addition, the HPE 202 comprises a redundant array of independent disks (RAID) configuration utility, disk format utilities, hardware drivers and patches, and operating system configuration utilities. During the operating system installation process, the HPE 202 can be executed from physical media 204 or through network delivery 206. The native preinstallation environment (NPE) 208 comprises a predetermined operating system and other content, which can be executed during the operating system installation process from physical media 210 or through network delivery 212. When invoked by a target system, the HPE 202 performs RAID configuration operations 204, followed by the formatting of hard drives and copying of operating system files and other content from NPE 208 as required and as described in greater detail below. As a result, the CPE can provide a uniform installation process for a plurality of heterogeneous operating systems such as, but not limited to, Netware 218, Windows 220, RedHat Linux 222, and Suse Linux 224.

Figure 3:
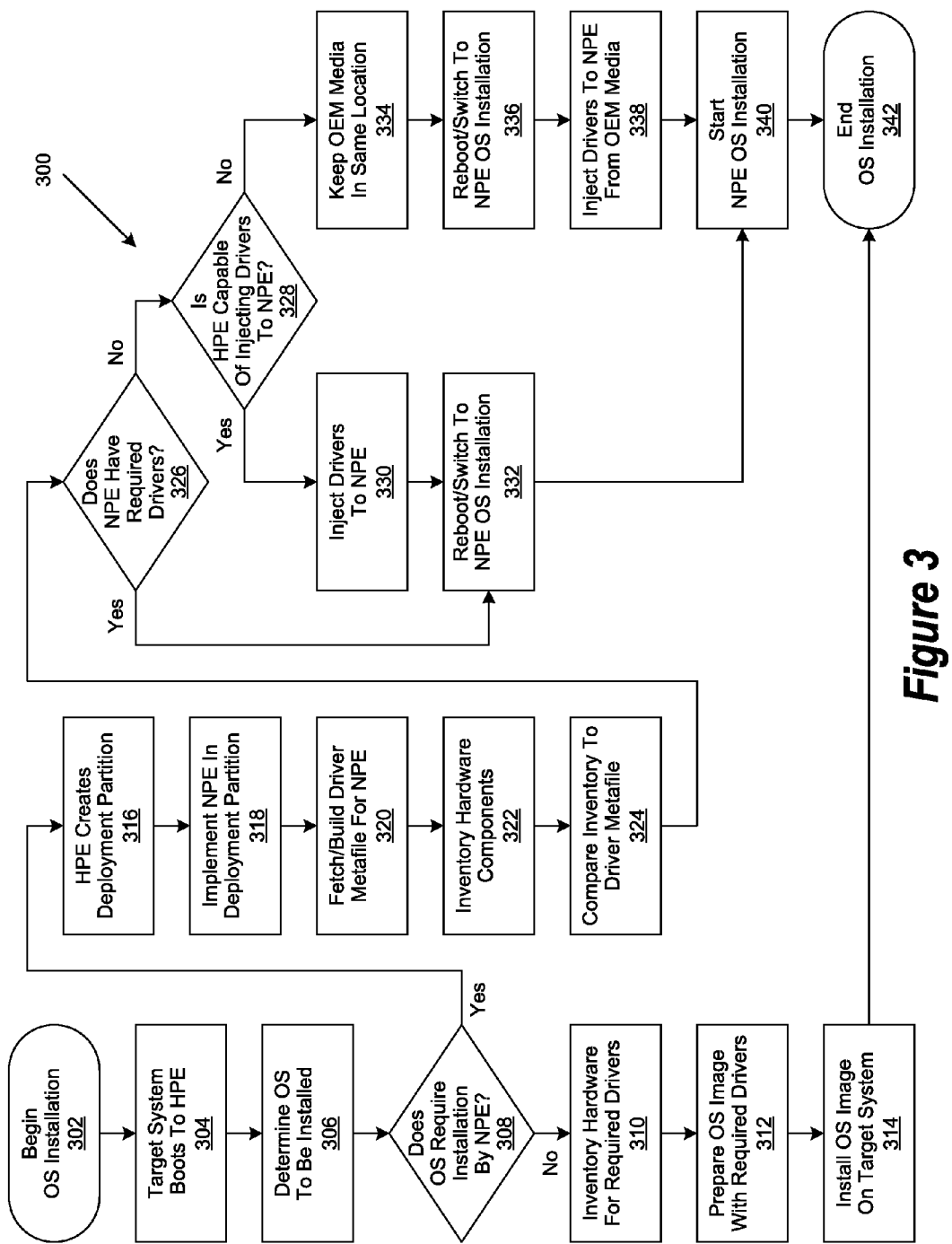
FIG. 3 shows a flowchart of a CPE as implemented in accordance with an embodiment of the invention.

FIG. 3 shows a flowchart of a common preinstallation environment 300 as implemented in accordance with an embodiment of the invention. In step 302 installation of a predetermined operating system (OS) is begun on a target computer, which boots to a host preinstallation environment (HPE) in step 304. In selected embodiments of the invention, an HPE comprises an information handling system, further comprising a common, bootable kernel operable to prepare a bootable operating system with drivers and patches for installation on a target system. The operating system to be installed on the target system is determined in step 306, and it is then determined in step 308 whether installation of the operating system will require a native preinstallation environment (NPE). Those of skill in the art will be familiar with the operation of an NPE, such as WINPE produced by Microsoft, which allows a system to boot prior to installation of an operating system.

In one embodiment of the invention, a target system accesses an NPE from attached physical media, such as a floppy disk, compact disk (CD), hard disk, or a flash memory device. In another embodiment, the target system automatically boots to a network connection to access an NPE implemented on a remote system. If it is determined in step 308 that the operating system chosen for installation on the target system does not require installation by an NPE, then the HPE inventories the target system's hardware components in step 310 to determine which hardware drivers are required for the chosen operating system. The HPE then creates an image of the chosen operating system and injects the required drivers in step 312. The resulting operating system image is installed on the target system in step 314, and once completed, operating system installation ends in step 342.

If it is determined in step 308 that the operating system chosen for installation on the target system requires installation by an NPE, then the HPE creates a deployment partition in step 316. Once created, a predetermined NPE such as WINPE is implemented in the deployment partition by the HPE in step 318. A driver metafile is fetched or built for the predetermined NPE in step 320, describing the hardware drivers it respectively supports for each operating system image. The HPE then inventories the hardware components comprising the target system in step 322 and compares the results to the metafile corresponding to the predetermined NPE in step 324. If it is determined in step 326 that the predetermined NPE has access to all drivers required to boot the target system, then the target system boots to the predetermined NPE in step 332 and begins native installation of the chosen operating system. In one embodiment of the invention, required drivers are injected into the NPE operating system image off-line, using a native driver injection module provided by the NPE vendor. The resulting operating system image is then installed by the NPE on the target system in step 340, and once completed, operating system installation ends in step 342.

If it is determined in step 326 that the predetermined NPE does not have access to all drivers required to boot the target system, then it is determined in step 328 whether the HPE can inject the required drivers into the predetermined operating system image contained in the NPE. If it is determined in step 328 that the HPE is able to inject the required drivers into the operating system image contained in the predetermined NPE, then they are injected in step 330. In an embodiment of the invention, required drivers are dynamically injected by generating a driver data block for the NPE. The data block has a beginning and ending signature allowing the HPE to inject binary bits without requiring knowledge of the underlying file system. The resulting operating system image is then installed by the NPE on the target system in step 340, and once completed, operating system installation ends in step 342.

If it is determined in step 328 that the HPE is unable to inject the required drivers into the operating system image contained in the predetermined NPE, then the required drivers are kept in their predetermined location in step 334 and the target system will boot to the predetermined NPE in step 336. Once the target system boots to the predetermined NPE, the NPE scans the HPE media in its predetermined location for drivers, and if found, injects them from the HPE media into the NPE operating system image in step 338. In one embodiment of the invention, the required drivers are stored on attached physical media, such as a floppy disk, compact disk (CD), hard disk, or a flash memory device. In another embodiment, the required drivers are stored on a remote system and are accessed by the NPE through a network connection. The resulting operating system image is then installed by the NPE on the target system in step 340, and once completed, operating system installation ends in step 342. It will be apparent to those of skill in the art that the invention provides the ability to dynamically inject drivers as they are required while also providing the ability to switch to a native operating system installation mode in absence of required drivers being available.

FIGS. 4*a-b* show the transition from a host preinstallation environment (HPE) to a native preinstallation environment (NPE) within a common preinstallation environment (CPE) as implemented in accordance with an embodiment of the invention. FIG. 4*a* shows a flowchart of the transition from an HPE to an NPE within a CPE as implemented in an embodiment of the invention. In step 402 installation of a predetermined operating system (OS) is begun on a target computer, which boots to an HPE in step 404. In selected embodiments of the invention, an HPE comprises an information handling system, further comprising a common, bootable kernel operable to generate a bootable operating system image for installation on a target system. The operating system to be installed on the target system is determined in step 406, and it is then determined in step 408 whether installation of the operating system will require an NPE.

If it is determined in step 408 that the operating system chosen for installation on the target system does not require installation by an NPE, then installation of the operating system continues with an HPE in step 410. If it is determined in step 408 that the operating system chosen for installation on the target system requires installation by an NPE, then a stage handler is implemented in step 412 to transition installation of the operating system from the HPE to the NPE. If a redundant array of independent disks (RAID) is to be implemented on the target system, predetermined RAID configuration operations are performed by the HPE in step 414. In step 416, the HPE prepares a dynamic deployment partition and transfers required hardware drivers to be used by the NPE during operating system installation. In an embodiment of the invention, this deployment partition is removed once installation of the operating system is complete. In another embodiment, the deployment partition and its hardware driver contents remain for future use by the NPE. In step 418, the NPE is implemented to install the chosen operating system on the target system. Once required operating system files and drivers have been copied to the target system, operating system media that is physically attached to the target system can be detached and installation of the operating system by the NPE continues in step 420.

FIG. 4*b* shows a table depicting the transition from an HPE to an NPE within a CPE as implemented in an embodiment of the invention. In this embodiment, the table comprises columns depicting transitional stages 422, stage descriptions 424 and staging options 426, further comprising a debug build 428 and a release build 430. In this table, RAID stage 432 comprises the execution of predetermined RAID configuration operations, which take place in the debug build, but not the release build. Driver stage 434 comprises the creation of one or more deployment partitions, the copying of driver files, and the optional removal of driver media once driver files have been copied, all of which take place in the debug build and in the release build on return of an error condition. operating system stage 436 comprises the copying of the operating system and other content to the target system, after which the driver media can be optionally removed, which takes place during the debug build but not the release build. In an embodiment of the invention a stage processing algorithm comprising the stage handler is implemented to define transition stages and execute predetermined processes, such as:

```
#define RAID_STAGE 0
#define OEM_STAGE 1
#define operating system_STAGE 2
int staging_handler(Requestrequest) {
    stage_level = request.get_stage_lever( );
    switch(stage_level):
        case TAID_STAGE:
            retval = configure_raid(request);
            return retval;
        case OEM_STAGE:
            retval = configure_raid(request);
            if (retval == SUCCESS) {
                retval = create_up(request);
                if (retval == SUCCESS) {
                }
            return retval;
            }
        case operating system_STAGE:
            retval = configure_raid(request);
            if (retval == SUCCESS) {
                retval = create_up(request);
                if (retval == SUCCESS) {
                    retval - create_dp(request);
                    if (retval == SUCCESS) {
                        set_no_reboot_flag( );
                        retval =
invoke_native_os_setup( );
                }
            return retval;
        case default;
            retval = full_os_install(request);
            return retval;
}
```

In an embodiment of the invention, additional processes can be executed within each transitional stage, such as configuration compliance, replication and error recovery.

Those of skill in the art will recognize that use of the invention automates the uniform installation of heterogeneous operating systems, especially when the hardware drivers required to complete the installation are previously unknown and are determined during the installation process. It will likewise be apparent that this ability of the invention is especially beneficial when heterogeneous operating systems are being installed on target systems that have different hardware configurations.

Skilled practitioners in the art will also recognize that many other embodiments and variations of the present invention are possible. In addition, each of the referenced components in this embodiment of the invention may be comprised of a plurality of components, each interacting with the other in a distributed environment. Furthermore, other embodiments of the invention may expand on the referenced embodiment to extend the scale and reach of the system's implementation.

What is claimed is:

1. A system for communicating information between a plurality of information handling systems, comprising:
    a plurality of heterogeneous operating systems at least one of the plurality of heterogeneous operating systems executing on a respective information handling system;
    a plurality of computer hardware drivers;
    a host preinstallation environment (HPE), comprising a common bootable kernel and predetermined operating system (OS) installation modules, operable to prepare an operating system image for installation on a predetermined information handling system;
    a plurality of native preinstallation environments (NPEs), comprising a predetermined operating system, associated operating system installation modules, and hardware drivers, operable to natively install an operating system image on a predetermined information handling system, and;
    a common preinstallation environment (CPE), comprising the HPE and one or more of the plurality of NPEs, operable to:
        automatically boot a predetermined information handling system without the prior installation of an operating system, and;
        implement the HPE and one or more of the plurality of NPEs to uniformly install one or more heterogeneous operating systems on the predetermined information handling system when the information handling system is booted; and, wherein
    the HPE is operable to generate a driver data block of binary bits, comprising a beginning and ending signature, such that the driver data block can be dynamically injected by the HPE into the operating system image without requiring knowledge of an underlying file system;
    the CPE is operable to generate a driver metafile comprising information relating to the computer hardware drivers supported by the predetermined NPE; and,
    the CPE is operable to inventory the hardware components comprising a predetermined information handling system, compare the results to the previously generated driver metafile, and determine whether the NPE requires additional drivers to install the predetermined operating system; and,
    the HPE is operable to dynamically inject predetermined computer hardware drivers into an operating system image generated by a predetermined NPE prior to its installation on a predetermined information handling system, the dynamically injecting the predetermined computer hardware drivers being responsive to a determination that the predetermined NPE does not have access to all drivers required to boot the predetermined information handling system.

2. The system of claim 1, wherein one or more heterogeneous operating systems is installed by a CPE residing on physical media attached to the target information handling system.

3. The system of claim 1, wherein one or more heterogeneous operating systems is installed on a target information handling system by a CPE residing on a remote system connected by a network.

4. The system of claim 1, wherein the CPE is operable to create a deployment partition to implement a predetermined NPE.

5. The system of claim 1, wherein the CPE comprises a stage handler operable to transition control of the installation of a predetermined operating system from the HPE to a predetermined NPE.

6. The system of claim 5, wherein the stage handler comprises an algorithm operable to determine at what stage of the installation of a predetermined operating system should control be transitioned from the HPE to a predetermined NPE.

7. A method for communicating information between a plurality of information handling systems, comprising:
   a plurality of heterogeneous operating systems;
   a plurality of computer hardware drivers;
   a host preinstallation environment (HPE), comprising a common bootable kernel and predetermined operating system (OS) installation modules, operable to prepare an operating system image for installation on a predetermined information handling system;
   a plurality of native preinstallation environments (NPEs), comprising a predetermined operating system, associated operating system installation modules, and computer hardware drivers, operable to natively install an operating system image on a predetermined information handling system, and;
   a common preinstallation environment (CPE), comprising the HPE and one or more of the plurality of NPEs, operable to:
      automatically boot a predetermined information handling system without the prior installation of an operating system, and;
      implement the HPE and one or more of the plurality of NPEs to uniformly install one or more heterogeneous operating systems on the predetermined information handling system when the information handling system is booted; and, wherein the HPE is operable to generate a driver data block of binary bits, comprising a beginning and ending signature, such that the driver data block can be dynamically injected by the HPE into the operating system image without requiring knowledge of an underlying file system;

the CPE is operable to generate a driver metafile comprising information relating to the computer hardware drivers supported by the predetermined NPE; and, the CPE is operable to inventory the hardware components comprising a predetermined information handling system, compare the results to the previously generated driver metafile, and determine whether the NPE requires additional drivers to install the predetermined operating system; and, the HPE is operable to dynamically inject predetermined computer hardware drivers into an operating system image generated by a predetermined NPE prior to its installation on a predetermined information handling system, the dynamically injecting the predetermined computer hardware drivers being responsive to a determination that the predetermined NPE does not have access to all drivers required to boot the predetermined information handling system.

8. The method of claim 7, wherein one or more heterogeneous operating systems is installed by a CPE residing on physical media attached to the target information handling system.

9. The method of claim 7, wherein one or more heterogeneous operating systems is installed on a target information handling system by a CPE residing on a remote system connected by a network.

10. The method of claim 7, wherein the CPE is operable to create a deployment partition to implement a predetermined NPE.

11. The method of claim 7, wherein the CPE comprises a stage handler operable to transition control of the installation of a predetermined operating system from the HPE to a predetermined NPE.

12. The method of claim 11, wherein the stage handler comprises an algorithm operable to determine at what stage of the installation of a predetermined operating system should control be transitioned from the HPE to a predetermined NPE.

\* \* \* \* \*